United States Patent [19]
Cutler et al.

[11] Patent Number: 5,718,968
[45] Date of Patent: Feb. 17, 1998

[54] MEMORY MOLDED, HIGH STRENGTH POLYSTYRENE

[75] Inventors: Philip W. Cutler, Olympia; Blue H. E. Goulding, Lacey, both of Wash.

[73] Assignee: Motherlode, L.L.C., Lacey, Wash.

[21] Appl. No.: 587,204

[22] Filed: Jan. 11, 1996

[51] Int. Cl.⁶ .............................. B32B 5/32; B32B 7/02; B29D 9/00
[52] U.S. Cl. .................. 428/218; 428/212; 428/304.4; 428/313.5; 428/316.6; 428/516; 428/523; 428/909; 521/56; 521/58; 521/146; 264/45.4; 264/51; 264/113; 264/120; 264/126; 264/294; 156/242; 156/245
[58] Field of Search .................. 428/212, 218, 428/304.4, 309.9, 313.3, 313.5, 316.6, 500, 516, 523, 909; 521/56, 58, 146, 918; 264/45.4, 51, 53, 54, 55, 109, 113, 120, 126, 294, DIG. 9, DIG. 10; 156/242, 245, 62.2, 308.2

[56] References Cited

U.S. PATENT DOCUMENTS

| | | | |
|---|---|---|---|
| 2,899,708 | 8/1959 | Donaldson et al. | 521/146 |
| 2,986,537 | 5/1961 | Chaumeton | 521/58 |
| 3,082,483 | 3/1963 | Bickford | 264/321 |
| 3,264,381 | 8/1966 | Stevens | 264/45.2 |
| 3,445,406 | 5/1969 | Koch | 521/56 |
| 3,458,608 | 7/1969 | Russell et al. | 264/45.6 |
| 3,459,274 | 8/1969 | MacPhail, Sr. | 181/291 |
| 3,676,033 | 7/1972 | Buonaiuto | 425/174 |
| 3,819,544 | 6/1974 | Pillar et al. | 521/60 |
| 3,832,429 | 8/1974 | Charpentier | 264/51 |
| 3,919,370 | 11/1975 | Cotterell | 264/45.4 |
| 3,935,044 | 1/1976 | Daly | 156/79 |
| 3,984,511 | 10/1976 | Lammers | 264/45.4 |
| 4,399,087 | 8/1983 | Akiyama et al. | 264/53 |
| 4,424,180 | 1/1984 | Lalloz et al. | 264/51 |
| 4,581,191 | 4/1986 | Hartmann | 264/143 |
| 4,698,001 | 10/1987 | Vismara | 425/4 R |
| 4,700,411 | 10/1987 | Kawasaki et al. | 2/425 |
| 4,816,199 | 3/1989 | Matz et al. | 264/53 |
| 5,056,162 | 10/1991 | Tirums | 2/412 |
| 5,114,656 | 5/1992 | Dionne et al. | 264/321 |
| 5,266,396 | 11/1993 | Howard | 428/306.6 |
| 5,298,208 | 3/1994 | Sibley et al. | 264/51 |
| 5,309,576 | 5/1994 | Broersma | 2/412 |
| 5,324,460 | 6/1994 | Briggs | 264/45.2 |
| 5,328,345 | 7/1994 | Yamamoto et al. | 425/4 R |
| 5,351,342 | 10/1994 | Garneau | 2/414 |
| 5,385,698 | 1/1995 | Bishop et al. | 264/53 |

FOREIGN PATENT DOCUMENTS

| | | |
|---|---|---|
| 2557437 | 7/1985 | France . |
| 2941 019 | 4/1981 | Germany . |
| 61-192545 | 8/1986 | Japan . |

OTHER PUBLICATIONS

Computer Search #1, pp. 1–12, Computer Search #2, pp. 1–6, Computer Search #3, pp. 1–3, Computer Search #4, pp. 1–3, Computer Search #5, 1 page, all dated Oct. 3, 1995.

*Primary Examiner*—Marie Yamnitzky
*Attorney, Agent, or Firm*—Christensen O'Connor Johnson & Kindness

[57] ABSTRACT

An expanded, memory molded, increased density, highly impact-resistant polystyrene construct, and method of making the construct. The construct is formed by molding pre-expanded non-equilibrated polystyrene beads to a first volume, cooling rapidly, and then compression molding to a final, smaller volume. The resultant constructs have increased density, and high impact strength without increase in embrittlement. Also, the construct has "memory" in the sense that it returns substantially to its original shape after impact.

14 Claims, 3 Drawing Sheets

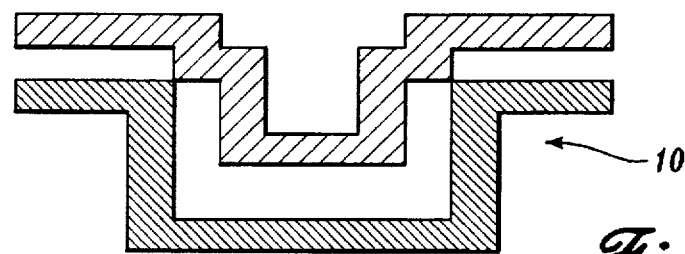
Fig. 2A
Fig. 2B
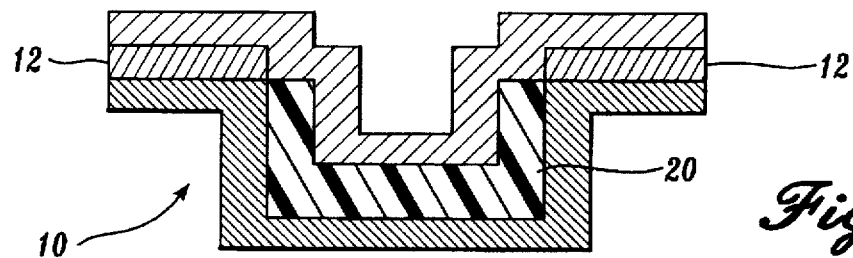
Fig. 2C
Fig. 2D
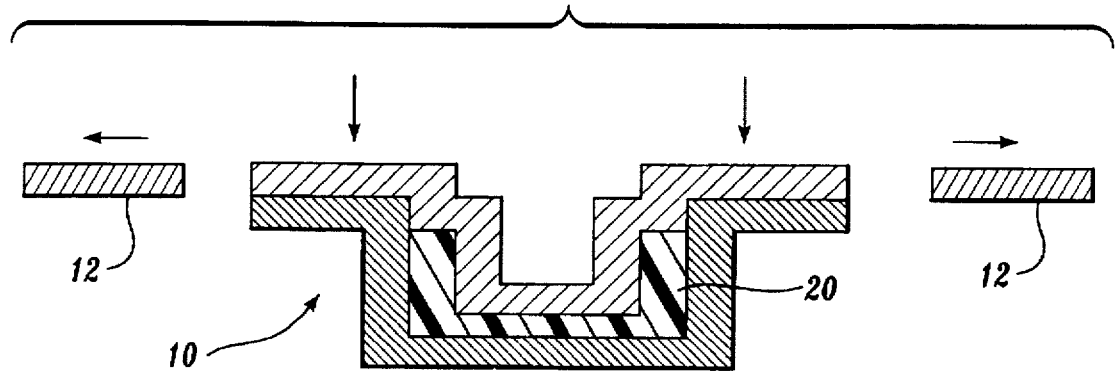

MEMORY MOLDED, HIGH STRENGTH POLYSTYRENE

FIELD OF THE INVENTION

The invention relates to memory molded, high strength expanded polystyrene having a density higher than the pre-expanded beads from which it is made. More particularly, the constructs of the invention have shape memory, with certain 0.5-inch thick constructs returning to their molded shape after impacts of 30-joules, or more, and higher impact resistance than previously possible in constructs of expanded polystyrene. Moreover, the memory, strength and density increases are not achieved at the expense of increased brittleness.

BACKGROUND OF THE INVENTION

It is known in the art to manufacture constructs of expanded polystyrene. Generally, these constructs are manufactured from polystyrene beads in a molding process. The beads include a thin outer shell of polystyrene and a hollow interior that contains a blowing agent, such as pentane, for example. As purchased from the manufacturer, these beads are "equilibrated" in the sense that the pressure inside the beads has equilibrated with atmospheric pressure due to the diffusion of air into the bead. The beads must be kept sealed in air-tight packaging or the entire amount of captured pentane will be released to the atmosphere. In order to expand the bead, the beads are heated, causing the blowing agent to vaporize. This results in increased pressure inside the beads which, in turn, causes the beads to expand in size. As a result, the density of a mass of beads subjected to heating treatment for expansion will decrease.

Conventionally, in order to prepare a molded product, the expanded beads are first allowed to "age" or equilibrate for 6 to 24 hours. This is a dynamic rather than a static process in that while the blowing agent diffuses out of the beads, air diffuses into the beads. The beads, under ambient conditions, will continue to "age" until they achieve a steady state or become "stale." Upon cooling of the heat-expanded beads, the internal pressure of the beads is reduced due to condensation of the blowing agent and the increased volume of the beads. Air diffuses into the expanded beads to equilibrate pressure between the bead interior and the surrounding atmosphere. The 6 to 24 hour-aged beads are then charged to the molding process where they are subjected to heat and pressure causing the beads to fuse together to form a unitary construct conforming to the shape of the mold. If the beads are not allowed to age, then the resultant products are characterized by unpredictable results such as collapsing, cracking, and post-expansion.

There are significant limitations in the state of the art relating to the production of expanded polystyrene constructs. For example, it is difficult to mold constructs to a final density of greater than about 8–9 lb. per cubic foot, without embrittlement of the construct so that it shatters upon even slight impact. Consequently, although there is a demand for denser, and potentially stronger, expanded polystyrene products, it has not heretofore been possible to fulfill this demand. More specifically, there is a need for an expanded polystyrene product that is more impact resistant, but less bulky, than products commercially available. Such an expanded polystyrene offers the potential of reducing transportation costs for goods that are packaged with surrounding molded expanded polystyrene protective trays. If these protective trays could be reduced in size, the volume of the shipment and its costs could be reduced. There are also numerous other applications where reduction in bulk, and an increase in impact strength, of expanded polystyrene would provide significant benefits. Indeed, such a strong highly impact-resistant expanded polystyrene product could open new fields of applications.

SUMMARY OF THE INVENTION

The invention provides expanded polystyrene constructs of high impact-resistance and strength, without an unacceptable increase in brittleness. The constructs have shape memory and a density at least about 200% greater than the density of the beads from which it was molded. The constructs also have better thermal insulating and sound insulating properties than the prior art expanded polystyrenes.

The constructs are molded from standard hollow polystyrene beads in accordance with a novel method of the invention. Moreover, the constructs are preferably layered for impact resistance and impact force absorption. These constructs have at least two, and preferably more layers, such that adjacent layers have different densities. The density of at least one of these layers is at least about 200% higher than the beads from which it is molded. In some instances, however, the construct may not be required to resist impact, but may be used for acoustical or thermal insulation. In this case, the construct may have only a single layer of molded polystyrene, according to the invention, that has a density more than about 200% greater than the density of the beads from which is was molded.

The expanded polystyrene construct is made up of deformed hollow beads that each have an outer shell of polystyrene, and that are each bonded or fused to adjacent beads to form a continuous body of the construct. The construct has a density in the range from greater than about $1.92 \times 10^{-2}$ g/cc (1.2 lb/ft$^3$) to less than about 1.03 g/cc (64 lb/ft$^3$). Moreover, depending upon its density, a construct about 20 mm (0.75 inch) thick is able to withstand an impact in the range from about 100 joules to about 150 joules, without brittle failure. Moreover, unlike prior art expanded polystyrene, the constructs of the invention have "memory" in the sense of substantially returning to their molded shape after an impact of a magnitude which would cause prior art expanded polystyrene to permanently deform.

In accordance with the invention, the molded, expanded polystyrene constructs are made using a mold in a multi-step process. In the first step, the mold is filled with expanded polystyrene beads that have not been aged to equilibrate internal pressure with the surroundings to any significant degree so that they retain an internal pressure that is less than ambient atmospheric pressure. The mold is fitted with a "stop" or "spacer" so that it will not close to compress the beads to the final mold volume, but will only compress the beads to a first volume that is less than the final volume. After molding the beads to the first volume, the beads are immediately cooled so that their internal pressure is below atmospheric pressure. The stop is removed from the mold, and the cooled compressed beads, still having low internal pressure, are then molded by further compression to a second volume, equal to the final mold volume and less than the first volume. This compression, carried out while the beads have internal pressures of less than atmospheric pressure, results in permanent compression of the beads and the forming of a construct in accordance with the invention.

The spacer can also be built directly into the tool. Thus, the tool may be fitted with a retractable insert to vary its internal volume so that a first molding step is in an effectively higher volume mold than a second molding step.

Furthermore, compression can also be accomplished off-line outside of the mold or press, using a second compression chamber with inserts to restrict its volume and thereby cause compression, provided that the fused beads are compressed while their internal pressures are still less than atmospheric. This latter technique is useful when forming constructs that have angles of greater than 45° to the parting line of the mold and that must be molded in separated parts and assembled before being re-fused into a single part.

Moreover, in accordance with the invention, additional beads may now be added to the mold and further molding steps, as described for the second molding step above, may be carried out. After each such molding step, a layer of the construct having increased density relative to its pre-expanded precursor beads is produced.

As a result of the successive molding steps described above, a layered construct is produced, in accordance with the invention. Each sequentially-produced layer may have different, usually lower, density than the prior layers. The more dense layer is particularly useful as the outer surface of, for instance a bicyclist helmet, to deflect impact while maintaining shape and the less dense inner layers absorb the impact to prevent or minimize transmission of forces to the head of a wearer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a schematic diagram showing a molding tool;

FIG. 2B is a schematic molded part made by the molding tool of FIG. 2A;

FIG. 2C is a schematic diagram showing the molding tool of FIG. 2A closed with spacers inserted to prevent complete filling of mold volume, in accordance with the invention;

FIG. 2D is the molding tool of FIG. 2A with spacers removed for use in compression molding in accordance with the invention.

DETAILED DESCRIPTION OF THE PREFERRED EMBODIMENT

Figure 1:
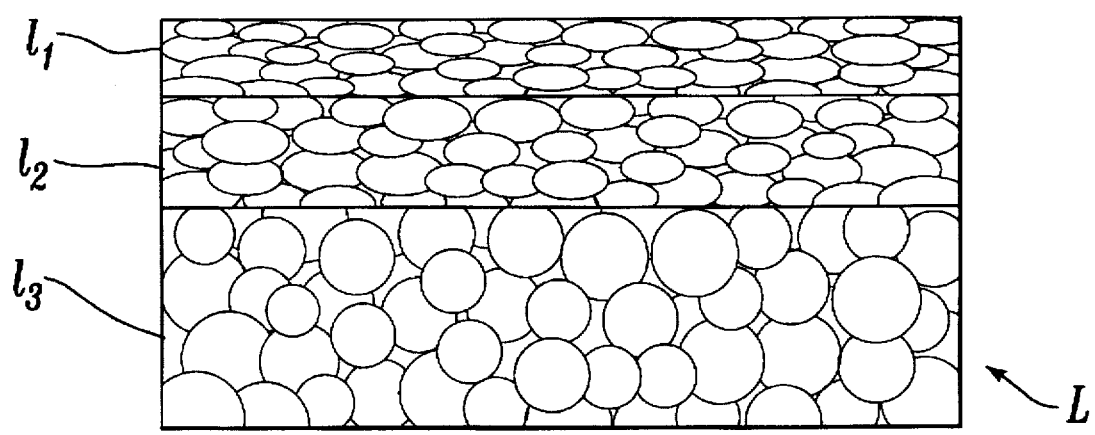
FIG. 1 is a schematic cross-section showing a layered construct of the invention.

The invention provides expanded polystyrene constructs of high strength and impact resistance without an unacceptable increase in brittleness. The constructs have "shape memory" and return substantially to their original shape after impacts that cause prior art polystyrenes to fail and deform permanently. Moreover, the constructs preferably have layers, at least one of which has a density at least about 200%, preferably at least about 300%, and most preferably at least about 400% greater than the beads from which it is molded. The layers are preferably of different densities to provide a density gradient through the construct, from one side to its opposite side. However, for certain applications, such as thermal insulation or acoustical insulation, the constructs of the invention are not necessarily layered because impact-resistance is not needed. Thus, a single layered construct of density at least about 300% higher than the beads from which it is molded may be useful in these applications.

It is theorized without being bound, that these constructs are obtained through the following mechanisms. In an initial step, commercially available polystyrene beads, each including a surrounding shell and an interior volume filled with a blowing agent, such as pentane, are pre-expanded. This pre-expansion is a conventional, controlled process requiring the application of heat through hot air and/or steam. Heat causes the blowing agent to vaporize and exert vapor pressure on the beads' polystyrene shell. The vapor pressure causes the beads to expand to a desired density, dictated by the heat applied in the expansion process. Upon cooling, the beads have reduced internal pressure due to the condensing of the blowing agent and the volume expansion of the beads.

Conventionally, beads are aged to equilibrate internal pressure with the surrounding atmosphere before molding. However, in accordance with the invention, these pre-expanded beads are preferably immediately (i.e., as soon as practically possible) charged to a mold where they are subjected to heat and pressure for molding to a first volume. While such beads are preferred, some benefits of the invention may be obtained from "partially equilibrated" or partially aged beads, as long as the beads are not completely aged or "stale" so that their internal pressure equals atmospheric pressure. The molded article is then rapidly cooled, in the mold, thereby causing the vaporized blowing agent within the beads to condense and create a pressure less than atmospheric inside the beads. Thereafter, the molded product with beads having low internal pressure is immediately (i.e., as soon as practically possible) subjected to compression to a second volume, less than the first volume. Because of the reduced pressure inside the beads, the beads will decrease in size by deforming readily and permanently under pressure, theoretically until pressure inside the decreasing volume of the bead equilibrates with applied pressure. There is no significant tendency of the bead, once compressed, to "spring back" to an original, more rounded shape, except at low densities of about 1 lb/ft$^3$. However, when this product is layered, this tendency is reduced or eliminated. Consequently, the compression achieved is permanent. Thus, a volume-stable, high density, high strength, highly impact resistant construct is formed.

Preferably, the construct is layered, having at least two layers of different density. Additional layers are formed, as explained below, by adding beads to the mold after the first molding step and then molding together the originally-molded layer with the additional beads. This results in a preferred layered construct of the invention, shown schematically in cross section in FIG. 1, wherein each layer $1_1$, $1_2$, $1_3$ has a different density than other layers and each layer has a density higher than the density of the beads from which it was molded, except when a last layer is a backfill layer of density equal to that of the beads from which it is molded. Preferably, the outermost layer $1_1$ has the highest density to deflect impact force and retain shape, while inner layers $1_2$, $1_3$ have lower densities to absorb impact forces to minimize transmission of these forces through the construct.

In a preferred embodiment, a 0.5-inch thick double-layered construct of the invention, that includes a 0.1875-inch thick layer of 1.89 lb/ft$^3$ density and a 0.3125-inch thick layer of 1.12 lb/ft$^3$, is able to withstand a 25-joule impact without visible damage and returns to its original shape. Preferably, the construct is able to withstand a 30-joule impact, and most preferably a 35-joule impact without such damage and return to its original shape.

The invention also provides safety helmets of layered construction that are able to withstand significant impacts, while transmitting less force to the head of the wearer, as explained in more detail in Example 2, below. Thus, an assembled layered construct of 0.75-inch thickness is able to attenuate a single 110-joule impact force without fracture and transmit less than 300 Gs. Moreover, the layered construct is able to attenuate two impacts of a 110-joule force without fracture and transmit less than 400 Gs.

The preferred layered constructs may have a plurality of layers. Preferably, as explained above, density ranges from highest to lowest from one outermost layer to the opposite outermost layer, but other density-layer arrangements are also useful in particular applications. Preferably, the ratio of density of the most dense to the least dense layer of a construct is in the range of about 50:1.0 to about 1.5:1.0, more preferably about 30:1 to about 1.5:10, and most preferably about 12:1.0 to about 1.5:1.0. While the relative thicknesses and densities of the layers depends upon the desired use of the construct, in general, it is preferred that the ratio of thickness of the highest density layer to the lowest density layer be in the range of about 1:1 to about 1:8, more preferably about 1:1 to about 1:5, and most preferably about 1:1 to about 1:3, for applications where thin constructs are most useful. In certain applications, the constructs are not layered, as explained above. For other specific applications, the ratios of density and thickness may vary from those given above.

The invention may be more readily understood with reference to the appended figures. FIG. 2A is a schematic diagram of a "squish"-type mold 10 conventionally used for molding expanded polystyrene to form a molded part 20, shown in FIG. 2B. In FIG. 2A, the mold is shown in a substantially open position after being filled with hollow expanded polystyrene beads. In FIG. 2C, the mold is shown in a closed position, with spacers 12 inserted to prevent complete closing of the mold to its final volume. The hollow beads in the mold are maintained at a temperature in the range from about 100° C. to about 110° C. for a period of time ranging from about 15 to about 20 seconds and are fused together to form a unitary structure. Thereafter, the mold is opened and the molded structure 20 inside is cooled with cold water. After rapid cooling, the spacers 12 are removed, and the mold is clamped shut under pressure (with as little delay as possible) as shown in FIG. 2D, thereby further compressing the molded structure to a higher density product. As a result, the molded product of the invention has a higher density than the hollow beads from which it is made, higher impact resistance shape memory, and greater flexibility than prior art polystyrene products. The resultant product also has greater sound-deadening properties, thermal insulating, and abrasion resistance capabilities than prior art molded expanded polystyrene products. Moreover, the higher strength and density are achieved without an increase in brittleness, as was common with prior art attempts at making high density expanded polystyrene.

Figure 3:
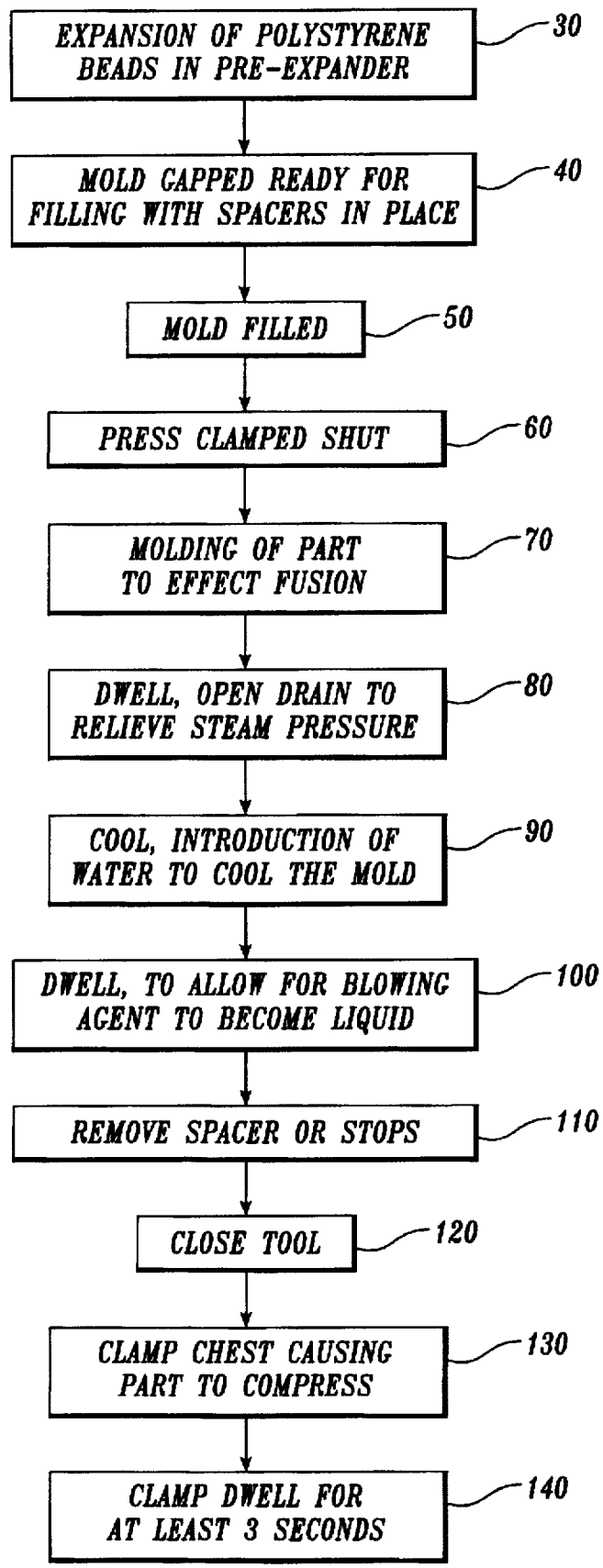
FIG. 3 is a flow chart showing the steps of the method of the invention.

The process for making the memory molded, high strength expanded polystyrene constructs of the invention is better understood with reference to FIG. 3. As shown, in step 30, commercially available polystyrene beads are pre-expanded, using conventional techniques, as explained above. Next in step 40, the mold is "gapped" with spacers put in place so that the mold is ready for filling. The mold is then filled with the pre-expanded beads, without allowing the beads to equilibrate or age, in step 50. Thus, the beads have internal pressures significantly lower than the surrounding ambient pressure.

Once filled, the mold is clamped shut in step 60. The first step of molding 70 to cause fusion of the beads is carried out.

Preferably, the molding is carried out at a pressure of from about 9 to about 12 psi and the product being molded is allowed to dwell at a temperature of from about 100° C. to about 110° C. for from about 15 to about 30 seconds. Thereafter, the steam chest drain valve is opened to relieve steam pressure in step 80. The molded product is then rapidly cooled by the introduction of water into the mold in step 90. The molded product is allowed to dwell with the cooling water for a sufficient time to enable the blowing agent within the beads to once again liquefy in step 100, typically, less than about 2 minutes, depending upon the thickness of the molded part. At that point, the mold spacers are removed in step 110 and the molding tool is closed completely in step 120. Pressure is applied to compress the molded product to the final shape of the mold in step 130. The clamping pressure is maintained for at least 3 seconds, and preferably for from about 5 to about 15 seconds, in step 140.

The final compressed molded product is dimensionally stable, showing limited tendency to re-expand to its first volume. Moreover, the density of the compressed molded construct is increased, due to its decrease in volume. Surprisingly, contrary to expectations, the high density molded product has increased impact resistance and strength without any significant increase in brittleness. Moreover, after an impact that would deform prior art expanded polystyrene permanently, the product surface regains its original shape, demonstrating a "memory" capability. Prior art expanded polystyrene products when impacted with a similar force do not return to their original shape, to any appreciable degree, but typically show a permanent indentation with substantial cell damage at the point of impact. The size of the indentation is dependent upon the severity of impact and shape of the impacting body.

As can be seen from FIG. 3, the process can be continued to produce molded products with more layers. Thus, steps 40 to 140 may be repeated. Theoretically, the density of layers of the construct could be increased to the original density of polystyrene, approximately 1.03 g/cc. Moreover, additional beads may be added at each, or at selected ones of, subsequent molding steps to produce the preferred layered constructs of the invention. These constructs have a hard, highest density outer shell to deflect impacts and retain shape, while having a more yielding, less dense inner layer protecting a product (or the head, in the case of a helmet construct) by absorbing impact forces so that less force is transmitted to the protected product (or the head). For example, a 0.5-inch (12.7 mm) thick construct of density of 1.87 lb/ft$^3$ made up of a 0.1875-inch thick layer of density 2.99 lb/ft$^3$ (and greater than the density of the beads from which it is made) and a 0.3125-inch thick layer of density 1.12 lb/ft$^3$, can withstand a 30-joule impact without visible permanent deformation and returns almost instantaneously to its original shape. Such an impact would be sufficiently high to permanently deform prior art expanded polystyrenes of the same average density and thickness. Of course, constructs of the invention can also be tailored to withstand much higher impact forces, as shown below.

The invention has limitations, however, in terms of the angles of the mold and hence the shape of segments of a molded product. Thus, it has been found that the compression process is less effective when pressure is applied at angles between 46° and 89° to the parting line of the mold. At such angles, it is theorized, without being bound, that compression pressure is diffused so that the compression ratio rapidly diminishes. Consequently, other techniques must be used to produce molded products that include angles beyond 45°. For example, such products can be molded as separate portions, none of which individually contains an angle greater than 45° to the mold parting line. Thereafter, the separately molded parts may be assembled together in a single mold and finally molded together.

A safety helmet, for example, is substantially hemispherically-shaped having a 360 degree circumference. Therefore, the helmet must be molded in at least five pans: crown, front, back, and two sides. None of the individual molds for these parts contains an angle that exceeds 45° to the mold parting line. After molding and compression of the individual parts, preferably as layered constructs, they are assembled over an internal plastic (vacuum-formed) shell using a system of interlocks or bosses. This subassembly is then placed into a second mold cavity, and another cycle of molding with addition of new beads is performed to create the inner shell and to bond all the individual parts together. During this molding, steam heat is applied to the new beads in the mold to permit molding. Steam heat will not penetrate the already molded subassembly to any useful extent for molding. The internal plastic shell, now trapped between two fused layers of expanded polystyrene beads, also helps to create surface tension on the inner shell and further enhance the impact resistance of the helmet. Off-press compression (i.e., not obtained on the press, but off-line during the molding of the final parts) technique, is ideal in this application because it speeds up the entire process.

The following examples are illustrative of the invention as described above and claimed below, and are not limiting of the invention.

EXAMPLES

Example 1

A 20 lb. (about 9 kg) batch of size B expanded polystyrene beads (obtainable from Arco Chemical Company as B-315 expanded bead) was pre-expanded in a continuous batch expander to a density of 1.12 lb/ft$^3$ (1.79×10$^{-2}$ g/cc). The pre-expanded beads were immediately injected, without aging, into an aluminum crack-filled or squish mold that was mounted on a steam chest. The steam chest was in turn mounted on a Kohler 603 hydraulic press. When fully closed, the aluminum mold would produce a part that is 0.1875 inch (4.8 mm) thick. However, the mold was cracked open 0.5 inch (12.7 mm) with spacers and filled with the pre-expanded bead. The spacer-restricted mold was closed to allow the part to be molded in the cracked-open position. Fusion of the beads was carried out using a 3-minute cycle time, including a 1-minute post-cooling time.

Immediately after cooling with water quench, the spacers were removed and the squish tool was closed using the hydraulic press, applying 6,000 psi to the face plate of the tool. The molded part was compressed to a first thickness of 0.1875 inch (4.8 mm). More beads were added to fill the mold cavity. The part was then remolded, with the additional beads, to a final thickness of 0.5 inch (2.7 mm). The first, originally 0.1875-inch thick, layer had a density of 2.99 lb/ft$^3$ (4.78×10$^{-2}$ g/cc), while the second layer now of 0.3125 inch thickness had a density of 1.12 lb/ft$^3$ (1.79×10$^{-2}$ g/cc). Therefore the average density of this piece was 1.87 lb/ft$^3$ (2.99×10$^{-2}$ g/cc).

For comparison, two control samples were made. The first sample was 0.5 inch thick made of the pre-expanded beads in a single molding step and had a density of 1.12 lb/ft$^3$. The second sample was also 0.5 inch thick, and was made in a one-step molding process from pre-expanded beads, and had a density of 3.5 lb/ft$^3$ (5.60×10$^{-2}$ g/cc). Neither of these two control samples were compressed.

Impact testing, using 15 joules of force, was conducted at the Snell Memorial Foundation Laboratory at Sacramento, Calif. on the construct of the invention and the 1.12 lb/ft$^3$ control. The results showed that the memory molded part of the invention was able to attenuate the force while transmitting 70 Gs to the interior monitor and showed no visible damage. The control transmitted more than 500.263 Gs, which is the highest force that the monitor was calibrated to register. The control was permanently deformed with clearly visible cell damage.

At the Snell Laboratory, the construct of the invention and the 3.5 lb/ft$^3$ control were both subjected to a 25.5-joule impact force. The results indicate that the construct of the invention only transmitted 211 Gs, and substantially retained its shape showing no visible damage. The control transmitted 314 Gs and was substantially damaged with permanent dents.

Example 2

A 20 lb. batch of size B expanded polystyrene beads (obtainable from Arco Chemical Company as B-315 expanded bead) was pre-expanded in a continuous batch expander to a density of 3.5 lb/ft$^3$. The pre-expanded beads were immediately injected, without aging, into an aluminum mold that was mounted on a steam chest, as explained in Example 1. The aluminum mold was made of five individual cavities, none of which contained an angle of 45°, or greater, relative to the mold paring line. The five cavities were shaped so that the molded parts could be snap-assembled into the shape of a motorcycle helmet. When fully closed, the aluminum mold would produce a molded part that is 0.75 inch thick.

The mold was filled with the pre-expanded bead, and fusion of the beads was carried out using a 3-minute cycle time, including a 1-minute water-quench post-cooling time. Immediately after cooling, internal spacers were attached to the individual molds thereby restricting mold internal volume, and the tool was closed using the hydraulic press, applying 6,000 psi to the face plate of the tool. The molded parts were compressed to a final thickness of 0.1875 inch. The parts were then snapped together in the shape of a motorcycle helmet. An internal micro shell, vacuum formed of 30 mil polystyrene material, formed an underneath surface of the parts and assisted in holding these together. The assembled helmet-shaped part was remolded with additional bead, in a different aluminum tool to a final thickness of 0.75 inch. The first 0.1875-inch thick layer had a density of 9.35 lb/ft$^3$ (14.96×10$^{-2}$ g/cc), while the second layer of 0.5625 inch had a density of 3.5 lb/ft$^3$ (5.6×10$^{31\ 2}$ g/cc). Therefore the average density of this piece was 4.96 lb/ft$^3$ (7.94×10$^{-2}$ g/cc). The helmet-shaped construct had memory molding as will be shown.

For testing purposes a control helmet was made. The control was 0.75-inch thick, made completely of the pre-expanded beads, with a density of 3.5 lb/ft$^3$. This control was not compressed but was made by conventional molding methods. Both helmets, the control and the helmet of the invention, were covered with a 60-mil vacuum-formed exterior shell made of polycarbonate.

Impact testing, using 110 joules of force, was conducted at the Snell Memorial Foundation Laboratory at Sacramento, Calif. The U.S. Department of Transportation, DOT, sets a 400 G maximum transmitted force standard for the sample subject to a double impact of 110 joules of applied force. Based on the results, the helmet of the invention passed the test, while the control failed the test.

The results reflect that the helmet of the invention was able to attenuate the joule force, while transmitting 233.316 Gs to the interior monitor. The control sample likewise impacted a transmittal force of 478.402 Gs. The memory molded helmet of the invention was again impacted at the same location of its surface (double impact), using a 110-joule force, and was able to attenuate this energy while transmitting only 352.701 of Gs to the monitor. The helmet was then impacted in a second spot using 152 joules of force and was able to attenuate this impact while transmitting 394.937 Gs to the monitor. The helmet was impacted again in the second spot using 110 joules of force (double impact) and was able to attenuate this energy while transmitting 499.67 Gs to the monitor.

The helmet made in accordance with the invention demonstrated shape memory under test conditions and retained its shape with minimal distortion, while the control helmet was substantially destroyed by the impact.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A layered expanded polystyrene bead construct comprising deformed hollow polystyrene beads, the beads of each layer fused to adjacent beads within the layer, and each layer fused to an adjacent layer in situ to form a continuous body of the construct, the layers each having a different density than another layer, and one of the layers of the body of the construct having a density at least about 200% greater than the density of pre-expanded hollow beads from which said construct was formed.

2. The construct of claim 1, wherein a 0.75-inch thick construct is able to attenuate a 110-joule impact force without fracture and transmit less than 300 Gs.

3. The construct of claim 1, wherein a 0.75-inch thick construct is able to attenuate two impacts of a 110-joule impact force without fracture and transmit less than 400 Gs.

4. The construct of claim 1, wherein the density of at least one of the layers is at least 300% greater than the density of pre-expanded beads from which the construct was formed.

5. The construct of claim 1, wherein the density of at least one of the layers is at least 400% greater than the density of pre-expanded beads from which the construct was formed.

6. A process for making a layered expanded polystyrene bead construct, the process comprising:

(a) filling a mold with pre-expanded hollow polystyrene beads of a predetermined density and having internal pressure less than atmospheric pressure;

(b) molding the pre-expanded beads, under applied heat and pressure to fuse the beads together to form a first intermediate product of a first volume;

(c) rapidly cooling the fused first intermediate product to ambient temperature to cause lower than atmospheric pressure conditions within the beads of the product; and (d) remolding the cooled first intermediate product under heat and compression to a second volume before the low pressure conditions within the beads equilibrate to ambient conditions, the second volume less than the first volume, to produce a fused expanded bead body of at least 200 percent higher density than the predetermined density of the pre-expanded beads; and (e) adding pre-expanded polystyrene beads to the mold and remolding the added beads under heat and compression to cause fusion of added beads at an interface to the expanded bead body to form a layered construct comprising at least two layers of beads wherein the layers have different densities.

7. The process of claim 6, wherein the step of remolding includes compressing to a second volume less than about one-half of the first volume.

8. The process of claim 6, wherein the cooling is by quenching with water.

9. The process of claim 6, wherein the step of remolding includes compressing to a second volume less than about one-third of the first volume.

10. A layered volume-stable expanded polystyrene bead construct, the construct produced by a process comprising:

(a) filling a mold with pre-expanded substantially unaged hollow polystyrene beads containing a blowing agent, the beads having a predetermined density and internal pressure less than atmospheric pressure;

(b) molding the beads, in the mold under applied heat and pressure to form a first intermediate product having a first volume;

(c) immediately after molding rapidly cooling the first intermediate product to ambient temperature;

(d) immediately after cooling, and before beads of the first intermediate product equilibrate to ambient atmospheric pressure, remolding the cooled first intermediate product in the mold under heat and pressure to a second volume, the second volume less than the first volume to produce a remolded product of at least 400 percent higher density than the predetermined density of the pre-expanded beads;

(e) adding pre-expanded polystyrene beads to the mold containing the remolded product and molding the added beads with the remolded product in the mold under heat and pressure; and (f) producing a layered volume-stable construct in situ, from the mold, the construct comprising at least two layers of beads wherein the layers have different densities.

11. The construct of claim 10, wherein step (c) of rapidly cooling comprises quenching with water.

12. A layered expanded polystyrene construct comprising deformed hollow polystyrene beads, the beads of each layer fused to adjacent beads within the layer, and each layer fused to an adjacent layer in situ to form a continuous body of the construct, the layers each having a different density than another layer, and at least one of the layers of the body of the construct having a density at least about 400% greater than the density of pre-expanded hollow beads from which said construct was formed wherein a more dense outer layer of compressed, fused-together beads deflects an applied impact force, and a less dense underlying layer of less compressed, fused-together beads absorbs transmitted impact force.

13. The construct of claim 12, wherein a 0.75-inch thick construct is able to attenuate a 110-joule impact force without fracture and transmit less than 300 Gs.

14. The construct of claim 12, wherein a 0.75-inch thick construct is able to attenuate two impacts of a 110-joule impact force without fracture and transmit less than 400 Gs.

* * * * *

UNITED STATES PATENT AND TRADEMARK OFFICE
CERTIFICATE OF CORRECTION

PATENT NO. : 5,718,968
DATED : February 17, 1998
INVENTOR(S) : P.W. Cutler et al.

It is certified that error appears in the above-identified patent and that said Letters Patent is hereby corrected as shown below:

On the title page,
Item [22]   Filed   "Jan. 11, 1996" should read --Jan. 10, 1996--

Signed and Sealed this

Fourteenth Day of July, 1998

*Attest:*

BRUCE LEHMAN

*Attesting Officer*   *Commissioner of Patents and Trademarks*